United States Patent
Surace

(10) Patent No.: US 12,397,468 B2
(45) Date of Patent: Aug. 26, 2025

(54) METHOD FOR FORMING MULTIPLE CERAMIC MATRIX COMPOSITE ARTICLES

(71) Applicant: RAYTHEON TECHNOLOGIES CORPORATION, Farmington, CT (US)

(72) Inventor: Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 122 days.

(21) Appl. No.: 17/977,370

(22) Filed: Oct. 31, 2022

(65) Prior Publication Data

US 2024/0139998 A1    May 2, 2024

(51) Int. Cl.
| | |
|---|---|
| *B23P 15/02* | (2006.01) |
| *B23P 15/04* | (2006.01) |
| *B28B 1/40* | (2006.01) |

(52) U.S. Cl.
CPC .............. *B28B 1/40* (2013.01); *B23P 15/02* (2013.01); *B23P 15/04* (2013.01)

(58) Field of Classification Search
CPC ............. B23P 15/02; B23P 15/04; B25B 1/40
See application file for complete search history.

(56) References Cited

U.S. PATENT DOCUMENTS

| | | | |
|---|---|---|---|
| 3,458,150 A | 7/1969 | Cowan | |
| 6,692,673 B2 * | 2/2004 | Nakamura | B29C 70/545 264/258 |
| 7,644,601 B2 | 1/2010 | Brochheuser et al. | |
| 8,906,179 B2 | 12/2014 | Coxon et al. | |
| 10,273,813 B2 * | 4/2019 | Kittleson | C04B 35/597 |
| 10,464,849 B2 * | 11/2019 | Pope | C04B 35/571 |

FOREIGN PATENT DOCUMENTS

EP    1122052    8/2001

OTHER PUBLICATIONS

European Search Report for European Patent Application No. 23205026.0 mailed Mar. 22, 2024.

\* cited by examiner

*Primary Examiner* — Sarang Afzali
(74) *Attorney, Agent, or Firm* — Carlson, Gaskey & Olds, P.C.

(57) ABSTRACT

A method includes providing a continuous mandrel body disposed along an axis. The mandrel body defines, in order along the axis from a first end thereof, a pilot lead-in section, a first article section, a tapered transition section, and a second article section. Beginning at the pilot lead-in section, a continuous fabric sleeve is progressively formed on the mandrel body to the first article section, to the tapered transition section, and then to the second article section to form a fabric-covered mandrel. The portions of the continuous fabric sleeve that are on the first article section and the second article section form, respectively, a first article preform and a second article preform. The fabric-covered mandrel is then divided to separate the article preforms, followed by densifying the article preforms with a ceramic matrix material to thereby form CMC articles.

12 Claims, 3 Drawing Sheets

METHOD FOR FORMING MULTIPLE CERAMIC MATRIX COMPOSITE ARTICLES

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for turbine components. Among other attractive properties, CMCs have high temperature resistance. Despite this attribute, however, there are unique challenges to implementing CMCs.

SUMMARY

A method for forming multiple ceramic matrix composite (CMC) articles according to an example of the present disclosure includes providing a continuous mandrel body disposed along an axis. The continuous mandrel body defines, in order along the axis from a first end thereof, a pilot lead-in section, a first article section, a tapered transition section, and a second article section. Beginning at the pilot lead-in section, a continuous fabric sleeve is progressively formed on the continuous mandrel body from the pilot lead-in section to the first article section, to the tapered transition section, and then to the second article section to thereby form a fabric-covered mandrel. The portions of the continuous fabric sleeve that are on the first article section and the second article section form, respectively, a first article preform and a second article preform. The fabric-covered mandrel is then divided to separate the first article preform from the second article preform. The first article preform and the second article preform is densified with a ceramic matrix material to thereby form, respectively, a first CMC article and a second CMC article.

A further embodiment of any of the foregoing embodiments includes, prior to the densifying, depositing an interfacial coating on the first article preform and the second article preform.

In a further embodiment of any of the foregoing embodiments, the dividing includes cutting the fabric-covered mandrel at locations between the first article section and the tapered transition section, between the second article section and the tapered transition section, and between the pilot lead-in section and the first article section.

In a further embodiment of any of the foregoing embodiments, the dividing includes cutting the fabric-covered mandrel at a location within the tapered transition section.

In a further embodiment of any of the foregoing embodiments, the first article section and the second article section are of identical geometry.

In a further embodiment of any of the foregoing embodiments, the first article section and the second article section are airfoil-shaped.

In a further embodiment of any of the foregoing embodiments, the first article section continuously flares from the pilot lead-in section to the tapered transition section, and the second article section continuously flares from the tapered transition section to an end of the second article section.

In a further embodiment of any of the foregoing embodiments, the first article section and the second article section are of different geometry.

In a further embodiment of any of the foregoing embodiments, the tapered transition section continuously tapers from the first article section to the second article section.

In a further embodiment of any of the foregoing embodiments, the tapered transition section flares from the first article section to an intermediate axial location along the tapered transition section, and the tapered transition section tapers from the intermediate axial location to the second article section.

In a further embodiment of any of the foregoing embodiments, the pilot lead-in section continuously flares from the first end to the first article section.

A mandrel for forming multiple ceramic matrix composite articles according to an example of the present disclosure includes a continuous mandrel body disposed along an axis. The continuous mandrel body defines, in order along the axis from a first end thereof, a pilot lead-in section, a first article section, a tapered transition section, and a second article section.

In a further embodiment of any of the foregoing embodiments, the first article section and the second article section are of identical geometry.

In a further embodiment of any of the foregoing embodiments, the first article section and the second article section are airfoil-shaped.

In a further embodiment of any of the foregoing embodiments, the first article section continuously flares from the pilot lead-in section to the tapered transition section, and the second article section continuously flares from the tapered transition section to an end of the second article section.

In a further embodiment of any of the foregoing embodiments, the first article section and the second article section are of different geometry.

In a further embodiment of any of the foregoing embodiments, the tapered transition section continuously tapers from the first article section to the second article section.

In a further embodiment of any of the foregoing embodiments, the tapered transition section flares from the first article section to an intermediate axial location along the tapered transition section, and the tapered transition section tapers from the intermediate axial location to the second article section.

In a further embodiment of any of the foregoing embodiments, the pilot lead-in section continuously flares from the first end to the first article section.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Fabrication of CMC articles may begin with forming a ceramic fiber fabric into the geometry of the article to be produced. For hollow articles, ceramic fibers are braided or woven around a mandrel to form a fiber preform. The geometry of the mandrel is analogous to the geometry of the article such that the fiber preform takes the shape of the article. Subsequently, an interface coating is applied to the fiber preform, followed by densification with a ceramic matrix material to form the final or near final article. This fabrication process, however, can be time-consuming and wasteful of the ceramic fibers. For instance, there may be substantial set-up time of the machinery for each mandrel to apply the ceramic fibers. Moreover, there is a lead-in region to each mandrel where the braiding or weaving is started before the geometry of the article. The lead-in region is not part of the final article and is thus removed later on, thereby resulting ceramic fiber waste.

Figure 1:
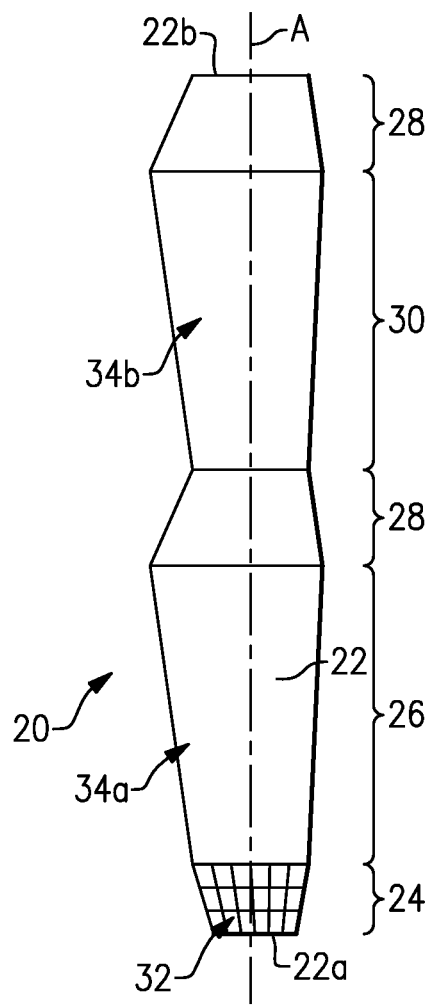
FIG. 1 illustrates a mandrel for fabricating CMC articles.

FIG. 1 illustrates a mandrel 20 for forming multiple ceramic matrix composite (CMC) articles. As will be appreciated from this disclosure, the mandrel 20 facilitates addressing one or more of the aforementioned challenges in CMC articles. The articles produced using the mandrel 20 are not particularly limited and may be turbine vanes, turbine blades, turbine blade outer air seals, or combustor pieces.

The mandrel 20 includes a continuous mandrel body 22 disposed along an axis A. The body 22 is continuous in that it is a one-piece structure that contains no mechanical joints. The continuity of the body 22 reduces the number of parts used in the process and may also facilitate enhancing the strength and rigidity of the mandrel 20 to resist loads on the mandrel 20 during processing. In this regard, the body 22 may be formed by 3-D printing, machining, or other process from graphite material, polymer material, metallic material, or composites of these materials.

Figure 2:
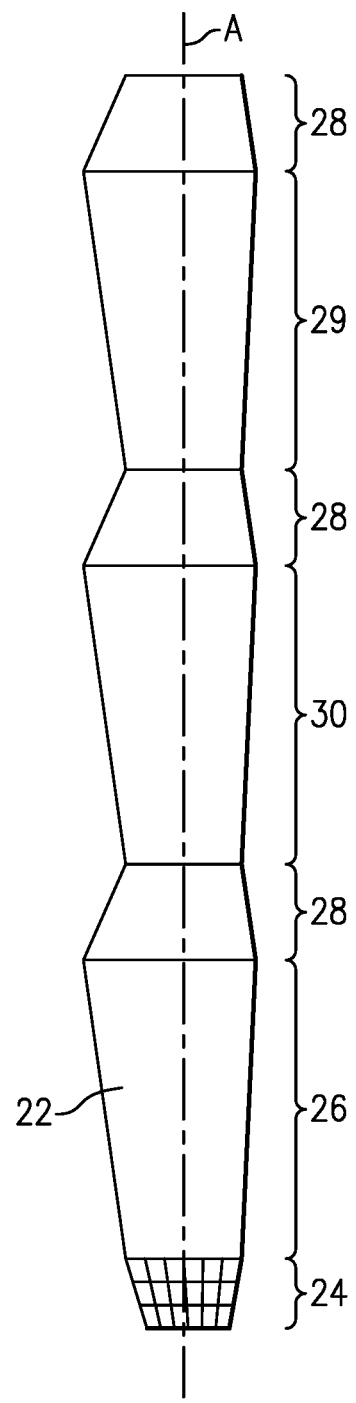
FIG. 2 illustrates another example mandrel.

The body 22 defines a first end 22a and an opposed second end 22b. The body 22 is comprised of several functional sections. In order along the axis A from the first end 22a, the body 22 includes a pilot lead-in section 24, a first article section 26, a tapered transition section 28, and a second article section 30. The geometries of the articles will be formed on the article sections 26/30, while the pilot lead-in section 24 and the transition section 28 serve to aid processing. In this example, two articles are to be produced via the two article sections 26/30. However, it is to be appreciated that the mandrel 20 may include additional transition sections 28 and article sections 29, as shown in FIG. 2, for producing three or more articles.

As indicated above, the pilot lead-in section 24 serves to facilitate processing. For example, the process of braiding or weaving ceramic fibers around the mandrel 20 begins at the pilot lead-in section 24. In this regard, the pilot lead-in section 24 is relatively narrow at the first end 22a and continuously flares from the first end 22a to the start of the first article section 26. This gradual tapering facilitates initiation of the braiding or weaving at a relatively small cross-section of the mandrel 20 and then gradually transitions to the larger cross-section at the beginning of the first article section 26.

The article sections 26/30 have geometries that are analogous to the articles that are to be produced, or portions thereof. In this example, the article sections 26/30 are airfoil-shaped and are identical to each other in geometry in order to produce identical articles, although the article sections 26/30 could alternatively have different geometries in order to produce different articles. The airfoil shape continuously flares from one end to the other. If the airfoil article being produced is a single cavity design, the airfoil-shape of the sections 26/30 will be of the entire or substantially entire airfoil geometry. If the airfoil article being produced is multi-cavity, the airfoil-shape will be a section of the entire airfoil geometry. For instance, the airfoil shape is analogous to the geometry of a leading cavity of the airfoil and thus has a geometry that is analogous to the leading edge and portions of the pressure and suction sides of the airfoil. In this case, the articles produced will be airfoil leading end cavity tubes. Alternatively, the airfoil shape may be analogous to the geometry of an intermediate cavity tube or a trailing cavity tube of the airfoil. Such tubes would then subsequently be assembled together with a skin wrap to produce a full airfoil. Alternatively, articles other than airfoils may be produced, in which case the article sections 26/30 will have a geometry that is analogous to the geometries of those articles.

Since the airfoil shapes flare, the opposed ends thereof are unequal in cross-sectional geometry. As a result, if the second article section 30 followed immediately after the first article section 26 (without section 28), there would be a size mismatch such that the mandrel 20 would have a steep step, which may be difficult to braid or weave over and may be a location of weakness where the mandrel could incur damage during processing. In this regard, the mandrel 20 includes the tapered transition section 28 between the two article sections 26/30. The taper of the transition section 28 provides a more gradual rate of change between the differently sized ends of the sections 26/30, or different geometries of the sections 26/30 for articles of different geometry, thereby enabling continuous, smooth braiding/weaving and facilitating the elimination of weak points. For instance, in the example shown, the transition section 28 continuously tapers from the first article section 26 to the second article section 30. In most cases, the transition section 28 will be relatively short, as the difference in the cross-sectional geometries between the opposed ends of the airfoil shape is relatively small. As an example, the axial length of the transition section 28 is from 15% to 50% of the length of each of the article sections 26/30. In further examples, the sides of the transition section may have an angle of approximately 3 degrees to 30 degrees relative to the axis A.

For the braiding or weaving process, the mandrel 20 is placed into a machine, such as a braider, for applying the ceramic fibers over the mandrel 20 to produce a seamless fabric 32 sleeve. The fabric sleeve 32 is braided or woven onto the mandrel 20 beginning at the pilot lead-in section 24 and then progressively proceeds along the mandrel 20 to the first article section 26, to the tapered transition section 28, and then to the second article section 30. This results in a continuous, seamless fabric sleeve 32 over the mandrel 20, i.e. a fabric-covered mandrel 20. The portions of the fabric sleeve 32 that are on the first article section 26 and the second article section 30 form, respectively, first and second article preforms 34a/34b.

Figure 3:
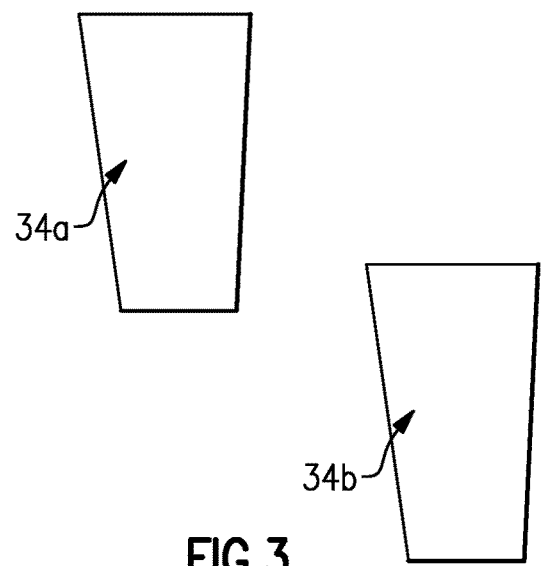
FIG. 3 illustrates article preforms produced using the mandrel of FIG. 1.

The fabric-covered mandrel 20 is subsequently divided, such as by cutting, to separate the first article preform 34a from the second article preform 34b, shown in FIG. 3. The portions of the fabric sleeve 32 that are over the pilot lead-in section 24 and the transition section 28 are not part of the final articles. Thus, the fabric-covered mandrel 20 is divided at the locations between the first article section 26 and the tapered transition section 28, between the second article section 30 and the tapered transition section 28, and between the pilot lead-in section 24 and the first article section 26.

An interface coating is applied to the article preforms 34a/34b, and then the article preforms 34a/34b are densified with a ceramic matrix material to thereby form, respectively, first and second CMC articles. At some point after the dividing, such as after application of the interface coating and an initial stage of densification, or after densification, the mandrel 20 is removed. The densification process is not particularly limited, but may include chemical vapor infiltration, polymer impregnation and pyrolysis, melt infiltration, or combinations thereof. Example ceramic matrices are silicon-containing ceramic, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC may be, but is not limited to, a SiC/SiC ceramic matrix composite in which SiC fiber fabric is disposed within a SiC matrix. The architecture pattern of the fibers in the fabric may be, but is not limited to, triaxial braid or a harness satin weave.

Figure 5:
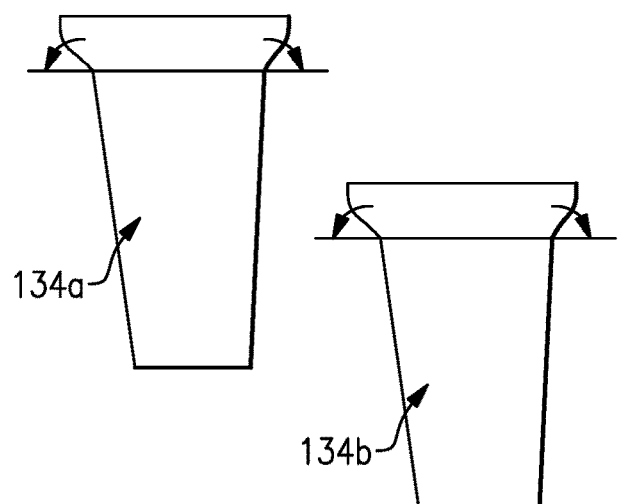
FIG. 5 illustrates article preforms produced using the mandrel of FIG. 4.
Figure 4:
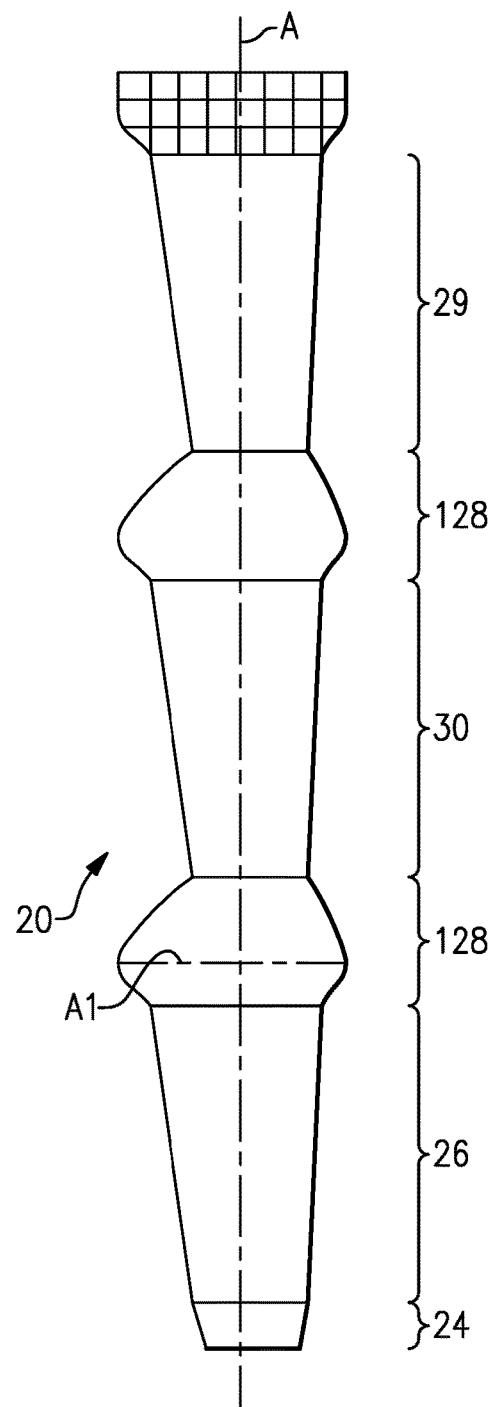
FIG. 4 illustrates another example mandrel.

FIG. 4 illustrates a modified example of the mandrel 20. In this example, rather than tapering continuously as in transition section 28, the tapered transition section 128 first flares from the first article section 26 to an intermediate axial location A1 along the tapered transition section 128. The tapered transition section 128 then tapers from the intermediate axial location A1 to the second article section 30. In this case, at least a portion of the fabric sleeve 32 over the transition region 128 forms a part of the final article. For instance, the fabric-covered mandrel 20 is divided at the location A1 to separate the preforms 134a/134b. The fabric in the transition section 128 may then be folded outwardly as shown in FIG. 5 to form what will be a platform on the final airfoil article.

Figure 6:
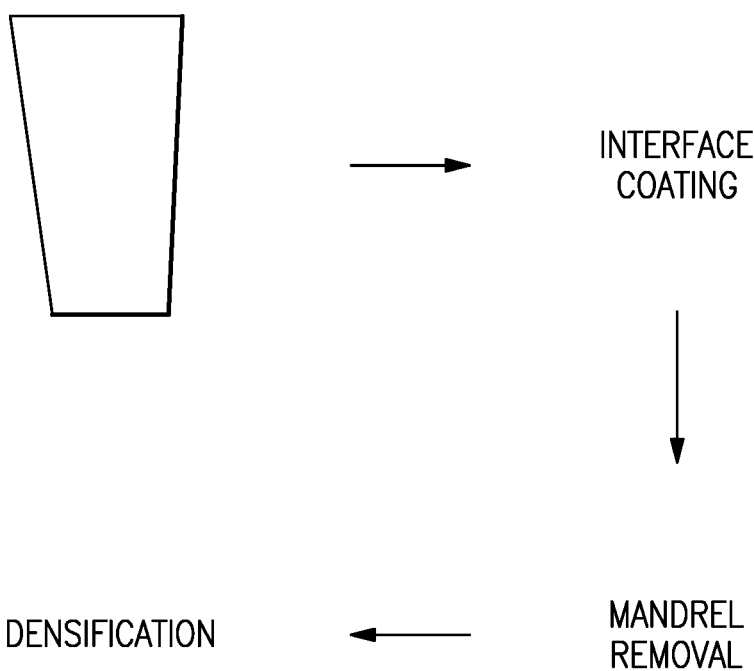
FIG. 6 illustrates a method for fabricating CMC articles.

FIG. 6 shows a pictorial representation of an example of the method for forming the CMC articles. After forming the preforms using the mandrel 20, the interface coating is applied. The coating may be, but is not limited to, boron nitride or carbon, and may be applied by vapor infiltration, for example. The mandrel 20 is subsequently removed from the preforms. For instance, the mandrel (cut pieces) are mechanically withdrawn from the preforms. The preforms are then densified with the ceramic matrix material. The timing of these actions with regard to one another may be varied. For example, the dividing may be conducted either before or after the deposition of the interface coating or at an intermediate stage of the densification. The mandrel removal will most typically be after the dividing, as wider portions of the mandrel 20 cannot be withdrawn through narrower portion of the fabric sleeve 32. However, if techniques other than mechanical withdrawal are used it may be possible to remove the mandrel 20 prior to the dividing.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for forming multiple ceramic matrix composite (CMC) articles, the method comprising:
providing a continuous mandrel body disposed along an axis, the continuous mandrel body defines, in order along the axis from a first end thereof, a pilot lead-in section, a first article section, a tapered transition section, and a second article section;
beginning at the pilot lead-in section, progressively forming a continuous fabric sleeve on the continuous mandrel body from the pilot lead-in section to the first article section, to the tapered transition section, and then to the second article section to thereby form a fabric-covered mandrel, wherein the portions of the continuous fabric sleeve that are on the first article section and the second article section form, respectively, a first article preform and a second article preform;
prior to densifying of the first article preform and the second article preform with any ceramic matrix material, dividing the fabric-covered mandrel to separate the first article preform from the second article preform; and
after the dividing, densifying the first article preform and the second article preform with a ceramic matrix material to thereby form, respectively, a first CMC article and a second CMC article,
wherein the continuous mandrel body is a one-piece structure that contains no mechanical joints.

2. The method as recited in claim 1, further comprising, prior to the densifying, depositing an interfacial coating on the first article preform and the second article preform.

3. The method as recited in claim 1, wherein the dividing includes cutting the fabric-covered mandrel at locations between the first article section and the tapered transition section, between the second article section and the tapered transition section, and between the pilot lead-in section and the first article section.

4. The method as recited in claim 1, wherein the dividing includes cutting the fabric-covered mandrel at a location within the tapered transition section.

5. The method as recited in claim 1, wherein the first article section and the second article section are of identical geometry.

6. The method as recited in claim 5, wherein the first article section and the second article section are airfoil-shaped.

7. The method as recited in claim 6, wherein the first article section continuously flares from the pilot lead-in section to the tapered transition section, and the second article section continuously flares from the tapered transition section to an end of the second article section.

8. The method as recited in claim 1, wherein the first article section and the second article section are of different geometry.

9. The method as recited in claim 1, wherein the tapered transition section continuously tapers from the first article section to the second article section.

10. The method as recited in claim 1, wherein the tapered transition section flares from the first article section to an intermediate axial location along the tapered transition section, and the tapered transition section tapers from the intermediate axial location to the second article section.

11. The method as recited in claim 1, wherein the pilot lead-in section continuously flares from the first end to the first article section.

12. The method as recited in claim 1, wherein the continuous fabric sleeve is formed on the pilot lead-in section from the first end of the continuous mandrel body to the first article section.

* * * * *